INVENTOR.
IRVIN E. KASS
BY
Roland G. Anderson

Aug. 9, 1966    I. E. KASS    3,265,152
UNDERWATER BEACON
Filed Aug. 26, 1964    4 Sheets-Sheet 2

INVENTOR.
IRVIN E. KASS
BY
Roland G. Anderson

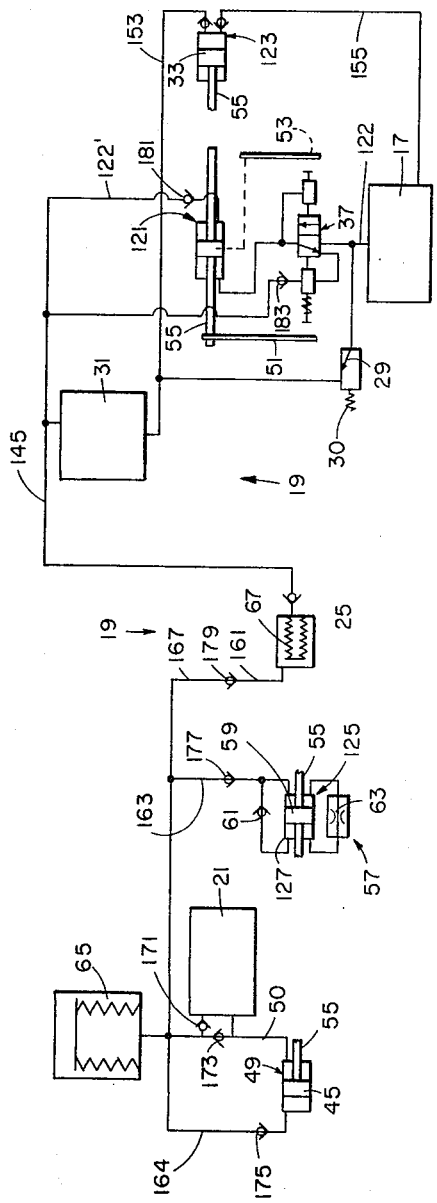
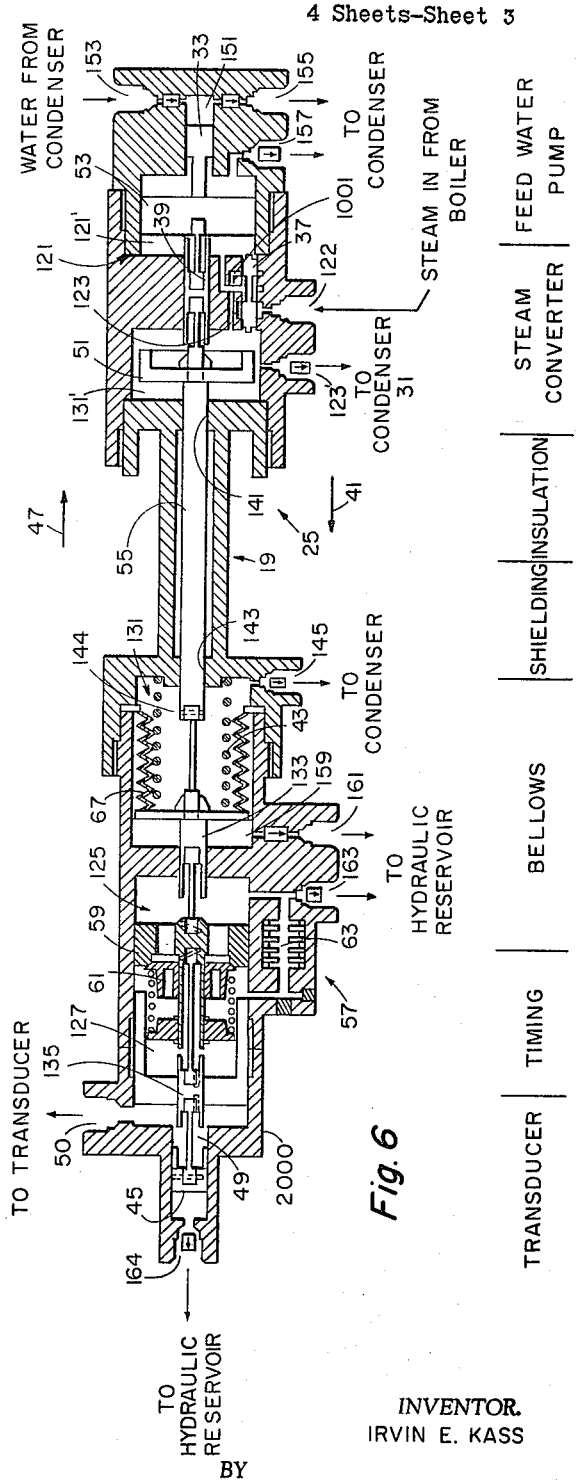
Fig. 5
Fig. 6
INVENTOR.
IRVIN E. KASS
BY
Roland A. Anderson

INVENTOR.
IRVIN E. KASS
BY Roland G. Anderson 3,265,152
UNDERWATER BEACON
Irvin E. Kass, Baltimore, Md., assignor, by mesne assignments, to the United States of America as represented by the United States Atomic Energy Commission
Filed Aug. 26, 1964, Ser. No. 392,349
6 Claims. (Cl. 181—.5)

This invention relates generally to navigation and in particular to novel method and apparatus for using radioisotopes for generating underwater acoustic signals that can be detected over long distances. This invention was made in the course of, or under contract with the United States Atomic Energy Commission.

In the field of navigation and oceanography, a need exists for underwater acoustic signals to provide a fixed navigation and or reference point. These signals must not only be omnidirectional, powerful and originate at various levels beneath the surface of the water but also must have the proper self-controlled power output and frequency to be generated and utilized effectively. It is also advantageous to provide signals that are uniform in timing and intensity for long periods of unattended operation.

Pneumatic devices for acoustic generation do not operate properly in long unattended operation at high power output levels. Others, such as those which depend on electrical components, require the manufacture and assembly of complicated electronic equipment or large power storage means that are costly or require frequent manual charging, maintenance or replacement for routine use. Moreover, it has been difficult, if not impossible to modify or use the heretofore known devices for operation underwater down to deep levels below the water surface.

It is an object of this invention, therefore, to provide an economical and practical apparatus and method for the generation in deep water of powerful acoustic signals providing a rugged, self-controlled, pressure tight and safe isotopically heated, thermal-fluid-mechanical mechanism for producing a constant steam pressure for intermittently, uniformly flowing a specific hydraulic fluid flow through a hydroacoustic oscillator to produce uniform, specific square wave power output acoustic pulses of the proper frequency;

Another object is to provide a means for utilizing a self-contained radioisotope source to make uniform pressure steam in such a way as to avoid any release of the contained material that might effect the source operating lifetime, the uniformity of the steam pressure or the contamination of the surrounding water;

Another object is to provide an isotopically powered underwater acoustic beacon having a long unattended operating lifetime;

Another object is to provide a relatively small, easily handled, isotopically heated power system for use down to deep levels below the water surface;

Another object is to provide automatic means for uniformly sequencing hydroacoustic oscillations of the proper frequency in a long life, unattended acoustic beacon for detection over long distances;

A further object is to provide a power flattening system for an isotopically heated power generator for generating uniform acoustic signals;

A still further object is to provide a simple, efficient, trouble-free system for generating underwater acoustic signals.

The foregoing objects are provided in this method and apparatus for the production of strong, periodic, uniform, underwater, acoustic signals for providing an underwater fixed reference point or navigation aid at a range of twenty miles or more for at least five years of unattended operation. The method and construction involved in this invention utilize standard and well known techniques and apparatus and are highly flexible for a wide range of applications, energies, ranges and unattended operating lifetimes. More particularly this invention contemplates the conversion of the heat energy produced from the decay of a radioisotope to steam and the conversion of the steam to acoustic energy through thermal-fluid-mechanical means. In one embodiment this conversion system, comprises an isotopic heat source and boiler for converting this heat to a uniform specific steam pressure, a power converter having a means for converting this steam sequentially into hydraulic energy, a hydroacoustic oscillator for converting the hydraulic energy into specific uniform acoustic pulses, and spring means for timing the interval between these pulses. As described in more detail, hereinafter, the steam compresses the spring to provide a specific control which is applied easily and dependably producing specific short and long intermittent hydraulic flows for determining the interval between specific sonic vibration pulses. Because of the specific sequential storage of the energy in the steam and spring to control the flow of a non-compressible hydraulic fluid, the generator and source can be relatively small, dependable and easily and safely handled and installed. Moreover, the steam pressure easily compensates the changing heat input due to the radionuclide decay of the source.

The above and further objects and novel features of this invention will appear more fully from the following detailed description when the same is read in connection with the accompanying drawings. It is to be expressly understood, however, that the drawings are not intended as a definition of the invention but are the purpose of illustration only.

In the drawings where like parts are marked alike:

FIG. 5 is a schematic drawing of the converter system of this invention;

FIG. 6 is a partial cross-sectional view of a practical converter of this invention showing the linkage between the steam and hydraulic sub-systems thereof;

It is known that acoustic sound energy can be transmitted in the form of compressional waves in a fluid medium from a source to a detector. This makes possible the location of the source by a detector having a transducer for converting the sound waves to electrical currents as is conventional. Conventional sound detection systems, for example, are described on pages 202–203 of The Elements of Physics, fourth edition, by Alpheus W. Smith. These systems embody the use of discontinuous, omnidirectional, waves that originate at a point and spread out in the water in the form of circles or spheres with the sound source at the center thereof. The direction and time of arrival of the waves at the transducer causes the transducer to produce characteristic electrical signals corresponding to the direction and distance of the transducer relative to the source.

The isotopic powered acoustic beacon of this invention, as hereinafter described in more detail, produces uniform, strong, omnidirectional signals of the proper output and frequency for long unattended operating times for detection by conventional detection systems, such as described in the above-referenced publication. The beacon of this invention is advantageously used to provide a low-cost navigational aid for small and large craft and to this end is useful in marking channels and fishing grounds, warning of reefs, sand bars and other navigational hazards and in ranging. This invention may also be attached to or released from submerged objects so as to locate the submerged objects.

Figure 1:
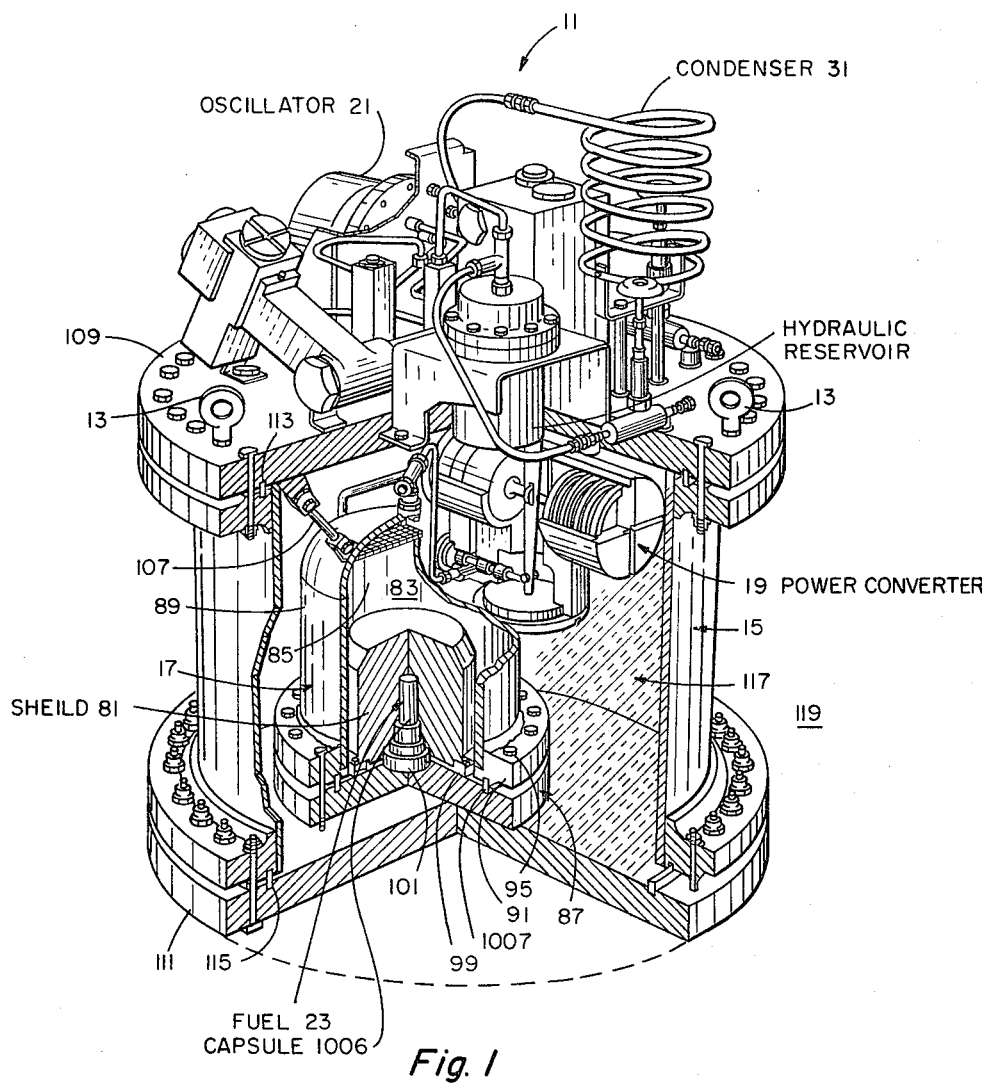
FIG. 1 is a partial three-dimensional view of the apparatus of this invention.
Figure 2:
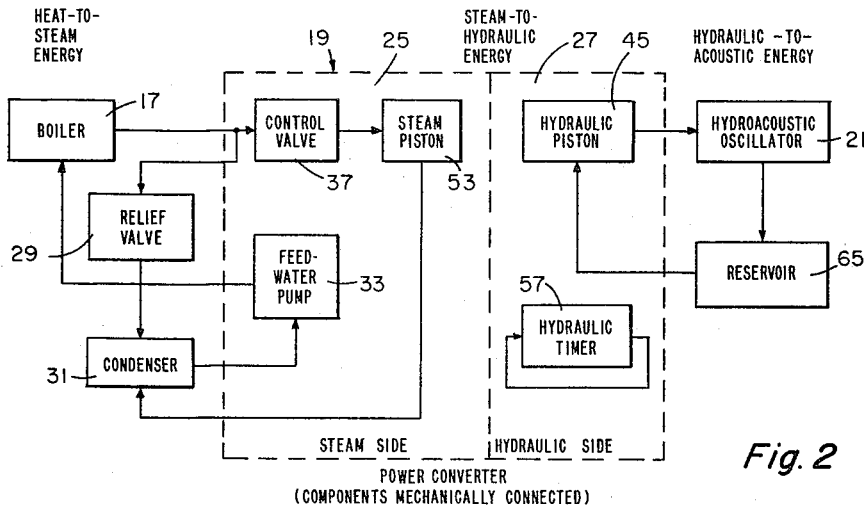
FIG. 2 is a diagrammatic drawing of the system of the apparatus of FIG. 1.
Figure 3:
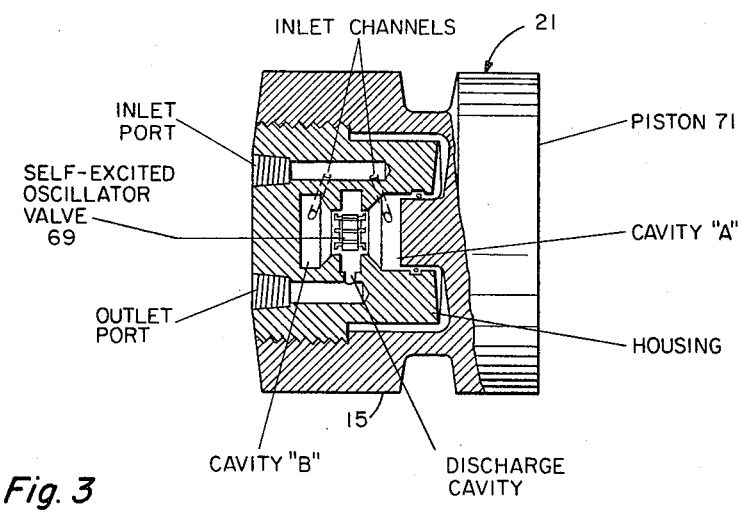
FIG. 3 is a partial cross-sectional view of the oscillator of FIG. 2.
Figure 4:
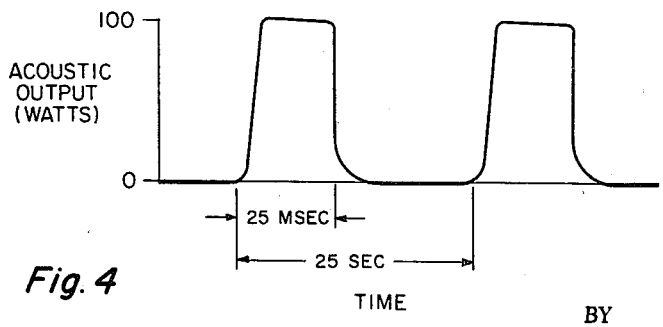
FIG. 4 is a graphic representation of the acoustic signal from the oscillator of FIG. 3.

With reference to FIGURES 1, 2 and 3 the device consists of an underwater unit suspended from suitable shackles 13 at one end for supporting or attaching a closed container 15 having therein a boiler 17, power converter 19 and hydroacoustic oscillator 21. FIG. 2 represents fluid connections. A suitable hydro-acoustic oscillator is shown in FIG. 3. These components accomplish the several functions necessary economically and safely to produce the square shaped acoustic signals (shown in FIG. 4) from the energy provided by a radioisotope fuel 23. To this end, this fuel source 23 generates steam in boiler 17 which is applied at a uniform specific pressure in steam side 25 of converter 19 to compress a spring actuated timer and for the generation of a specific hydraulic flow in hydraulic side 27 of converter 19 that is converted to specific acoustic energy pulses in oscillator 21 with a uniform time interval therebetween.

The boiler 17 contains the radioisotope fuel 23 and serves efficiently to generate and store energy in the form of saturated steam at a specific pressure, e.g., 150 p.s.i. As illustrated in FIG. 5, an adjustable spring controlled relief valve 29 has a spring 30 adjustably loaded to discharge excess steam above the predetermined pressure to condenser 31 so as to compensate for the change in heat output of source 23 due to the decay of the isotope 23. Condensate is returned to the boiler 17 by a feed pump 33 which is part of the steam side 25 of power converter assembly 19.

A practical arrangement for the converter of this invention is shown in FIG. 6. The steam from the boiler drives power converter 19 and actuates its valving and piston arrangement on its steam side 25 to provide a self-controlled, uniform sequence of operations. To this end, at the proper time in the cycle, spool control valve 37 admits steam to the converter steam cylinder 121' which drives the converter components through the power stroke, whose direction is shown by arrow 47. This compresses spring 43, and also operates power piston 45 on the hydraulic side 27 in a power stroke direction shown by arrow 47. This stroke displaces pressurized hydraulic fluid in chamber 49 into the hydroacoustic oscillator through passage 50 thus energizing that component. This also operates the feed water pump 33 so as to pump condensate to the boiler. The position of the valve bumper 51 and piston 53 connected to connecting rod 55 controls the position of control valve 37. At the end of the power stroke bumper 51 moves the valve 37 to the right closing port 122 thus shutting off steam to cylinder chambers 121', and uncovers port 1001 thus permitting steam to flow from cylinder chamber 121' through passage 122' and 123 to chamber 131' and exhaust to condenser 31. This releases the energy stored in the compressed spring 43 for the return stroke.

The timing stroke system is controlled by hydraulic timer 57 which controls the interval between power strokes. It comprises a timing piston 59 connected also to rod 55, check valve 61 and a calibrated orifice 63 which allows hydraulic fluid to flow from chamber 127 through orifice 63 to a chamber 125 at a controlled rate. This return stroke also draws condensate into the feed pump 33. At the end of this return stroke the control valve 37 ports the boiler 17 to the steam cylinder chamber 121' to drive piston 53 for the beginning of another cycle.

The hydraulic side 27 is mechanically coupled to the steam side 25 by piston rod 55 shown in FIG. 6. A bellows 67 provides a barrier against leakage between the steam side 25 and the hydraulic side 27. These approaches lead to an efficient, compact low volume system with positive sealing between the steam and hydraulic fluid. Arranged within the bellows 67 is the return spring 43 for the return stroke.

The acoustic oscillator 21 generates a sinusoidal acoustic signal from the flow of the hydraulic fluid. To this end, this oscillator has two cavities A and B separated by a self-excited valve 69. The axial motion of the valve allows the fluid alternately to enter and leave the cavities thereby providing a sinusoidal variation in pressure at the piston 71. This gives the piston 71 a sinusoidal oscillation of 5000 c.p.s., which sets up sinusoidal, omnidirectional, corresponding sonic vibrations in the water.

A broad spectra is afforded in operating variables. For example, it is possible to operate unit 11 easily and dependably at any steam pressures for operation at various depths or pressure levels to achieve a range of greater than twenty miles or to change the pulse width. However, in producing a 100 watt output, actual typical conditions comprise a 750 p.s.i. oil pressure drop across the sound transducer at a flow of 1.5 g.p.m. therein and full power output in 2 milliseconds after establishment of design flow for producing a .025 sec. power stroke and a 25 sec. timing stroke. Since a small amount of hydraulic fluid and mass is accelerated during each pulse, square wave pulses are produced. Additionally, valve life is extended by special long-life valve materials, such as tungsten-carbide (e.g., Stellite brand tungsten-carbide metal), which are used in the steam water side 25 of the power converter 19.

In the operation of the thermal-fluid mechanical system of this invention in deep seat water, boiler 17 has a strontium-90 source 23 in the form of an insoluble compound, such as strontium-90 titanate, contained in a sealed capsule 1006. Radiation shield 81 is made of a material that absorbs energy from the incident radiation. The heat from the decay of this source 23 flows through the capsule 1006 and shield 81 into about 340 cubic inches of demineralized water 83 in chamber 85 formed by boiler container 17. To confine the pressure of the steam produced in chamber 85 and to permit fueling the boiler 17, the boiler 17 comprises a heavy gage corrosion resistant metal member 89 and cap 87 forming the boiler 17. For access a mating flange 91 on member 89 bolts tightly to metal cap 87 with strong bolts 95 and nuts (at one side thereof as is conventional), thus selectively sealing the fuel 23 and radiation shield 81 into the boiler 17. The tension of these bolts compresses positive seal 1007 between the flange 91 and cap 87 to prevent the release of the steam outwardly. The inside of cap 87 also carries a flange 99 that positions the shield in the boiler 17. The plug 101 provides radiation shield and fuel capsule retainer. All these elements are made from strong, corrosion resistant material like the material of member 89.

Additionally, the boiler 17 is supported in container 15 by rods 107 and has removable opposite plates 109 and 111 which compress removable seals 113 and 115 therebetween. This prevents leakage of sea water 119 into the inside of container 15 at deep sea-water levels while permitting easy access to the contents thereof when required. Thermal insulation 117 inside container 15 prevents the flow of heat from boiler 17 to the ambient outside of the container 15. This insulation 117 advantageously comprises calcium silicate insulation with 85% magnesia insulating cement. Unit 11 thus provides the efficient generation of steam with a relatively small, safe and easily handled source 23.

In the operation of converter 19, steam from the boiler 17 is admitted to steam cylinder 121 against bumper piston 53. To this end the steam passes through channel 122, spool valve 37 and channel 122', the spool valve 37 being actuated by the steam piston 53 and bumper disc 51 which moves in the direction shown by arrows 41 and 47 during the timing stroke and power stroke, respectively. The timing stroke direction, shown by arrow 41, is powered by spring 43.

FIG. 6 shows the spool valve in its middle position as the sprng 43 moves the piston rod 55 in the timing stroke direction. When rod 55 reaches the end of its movement in this timing direction bumper piston 53 moves spool valve 37 into its power stroke position.

Figure 7:
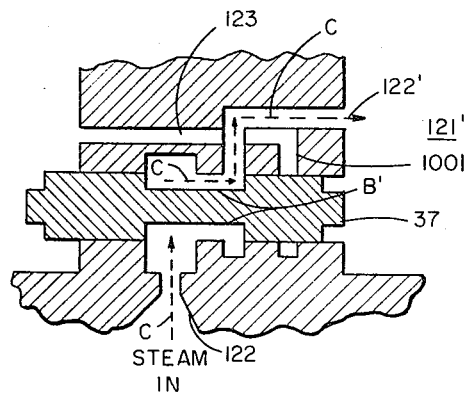
FIG. 7 is an enlarged view of the valve of FIG. 6 in the power stroke position.

The power stroke position of valve 37 is shown in FIG. 7. It will be seen there that steam passes from channel 122 in path C through cut-out portion B' of spool valve 37, through channel 122' and into chamber 121' of cylinder 121 to drive piston 53 in its power stroke direction. This actuates oscillator 121 and compresses spring 43.

Figure 8:
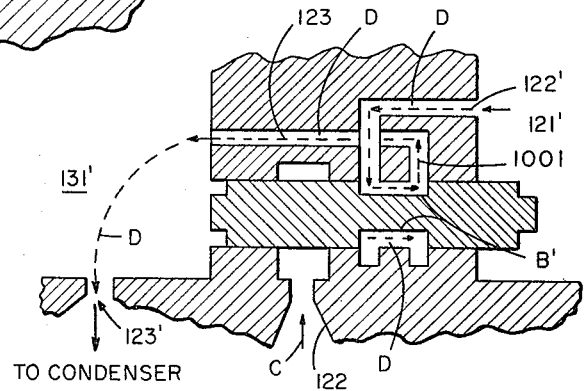
FIG. 8 is an enlarged view of the valve of FIG. 6 in the timing stroke position.

At the end of this power stroke direction the bumper 51 moves the spool valve 37 into its timing stroke position, shown in FIG. 8. This permits the steam from boiler 17 to pass into channel 122 but is blocked from entering cut out portion B', or communicating therefrom to channel 122' or chamber 121 by spool valve 37. Meanwhile, spool valve 37 exhausts the steam from chamber 121' in path D through channels 122', across cut out portion B' of valve 37, through channel 123, through chamber 131', through port 123' and into condensor 31. This permits compressed spring 43 to release its energy in its timing stroke cycle by biasing rod 55 to flow oil through flow control valve 63 until bumper piston 53 again moves spool valve 37 into its power stroke position. Meanwhile, relief valve 29 maintains a constant pressure in boiler 17 for the uniform actuation of piston 53 in its power stroke direction after the bumper piston 53 moves the spool valve 37 into this power stroke position.

Power from the steam cylinder chamber 121' and its piston 53 is transmitted by shaft 55 to cylinder power chamber 49. This cylinder chamber 49 provides an efficient pressure and short, fast flow pulses of hydraulic fluid for the acoustic oscillator 21 with a small fluid flow. One advantageous fluid is SUN-VIS 916 brand hydraulic fluid. Also, on the power stroke fluid is forced to flow from the timing cylinder chamber 125 through the check valve 61 into chamber 127. On the return stroke the check valve 61 is closed and fluid flows from chamber 125 through orifice control 63 to chamber 125 to provide the timing between pulses.

Necked down portion and plug 39 moves with rod 55 while blocking the flow of steam along rod 55 from first chamber 121' to second bellows chamber 131, plug 133 moves with rod 55 while blocking the hydraulic fluid in the second chamber 159 from passing along rod 55 into the hydraulic timing or third chamber 125 and vice versa and plug 135 moves with rod 55 while blocking the hydraulic fluid from flowing between portion 127 of timing chamber 125 and power chamber 49. Most of the steam in chamber 131' is advantageously blocked from flowing through to chamber 131 by lands 141 and 143 which force this steam from enclosure 131' through exhaust 123' to condensor 31. The steam side 144 of bellows chamber 131, however, also has an exhaust 145 to return steam that leaked past lands 141 and 143 to the condenser 31.

Water from condenser 31 enters water pump chamber 151 through inlet 153 and leaves therefrom through exhaust 155. Piston 53 blocks the steam from behind steam piston 53 in chamber 121' but the leakage of steam past piston bumper 53 is transferred to condenser 31 through exhaust 157.

The hydraulic fluid from reservoir 65 is circulated to the hydraulic side against power piston 45 by channel 164. Channel 161 and 163 provides a path to the reservoir 65 for fluid which has leaked past portions 135 and 133 of rod 55. The necked down, small diameter portions of interconnecting rod 55 permit eccentricities between adjacent boxes in converter cylinder 2000.

Suitable check-valves 171, 173 and 175 permit the hydraulic fluid to flow through oscillator 21 only in the power stroke direction. The oscillator is by-passed by these valves when the fluid flow is in the opposite direction. Likewise, check valve 61 permits the fluid to flow through orifice 63 only in the timing stroke direction. The valve 61 by-passes the flow during the power stroke.

Check valve 181 is provided to prevent condensate return. Check valve 181 provides a return path for steam that leaks past bumper piston 53.

Figure 9:
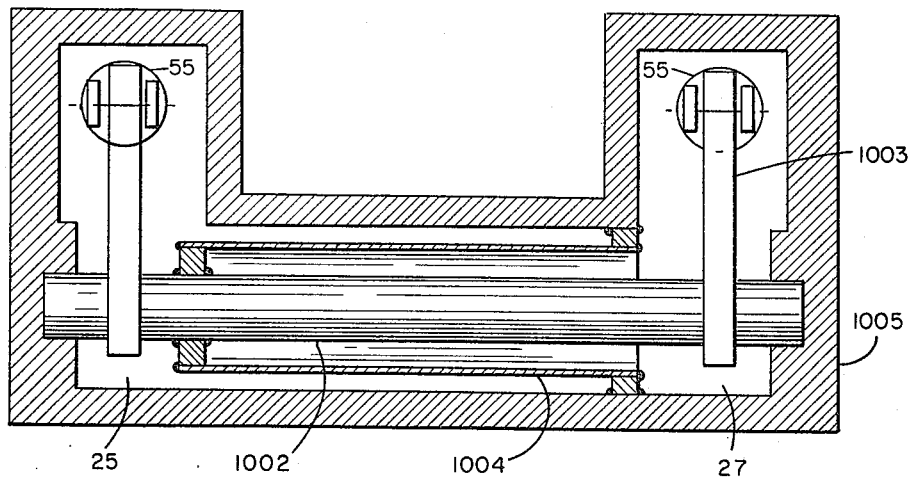
FIG. 9 is a partial cross-section of another embodiment of the steam-hydraulic barrier of FIG. 6.

An alternate design for bellows 67 that would provide a reliable long life barrier is shown in FIGURE 9. The axial motion of piston rod 55 is converted to rotary motion of shaft 1002 by bellcrank 1003. Flexible torque tube 1004 is welded at one end to shaft 1002 and at the other end to housing 1005 thus providing a permanent seal between hydraulic side 27 and steam side 25.

It is also understood that since the system of this invention is completely self-controlled that it can be suitably encased for generation of sound at the deepest ocean levels and can be activated for operation at any depth.

The above described system directly and simply converts heat to suitable sound energy at low cost for detection at long and short distances by conventional detectors. Also, this system has high reliability without rotating parts or electronics. Moreover, it is easily handled by skin divers. Additionally, it has demonstrated its ability to operate without service deep levels underwater for long operating times.

What is claimed is:

1. Apparatus for providing an underwater acoustic beacon that comprises:
    (a) a liquid tight housing;
    (b) means for immersing the housing in a body of water;
    (c) a water source in said housing;
    (d) an isotopic heat source for converting said water to steam energy in a closed cycle that stores energy in said steam;
    (e) cyclic piston means that is biased by said steam in a power stroke in one direction for producing a closed cycle hydraulic fluid flow;
    (f) spring means that is compressed by said power stroke to store energy in said spring;
    (g) mechanical means responsive to said piston biasing for selectively causing said spring to release its energy to flow said fluid uniformly through an orifice in opposite timing;
    (h) oscillator means for converting said fluid flow in said power stroke direction into sonic vibrations in said housing for transmission to said water, said power stroke flow producing strong, square-shaped acoustic signals in said water of about 5000 c.p.s.

2. Apparatus as set forth in claim 1, including means for by-passing excess steam pressure for compensating for the decay of said isotopic heat source, which reduces the rate of heat flow therefrom, for uniformly converting said steam energy into hydraulic fluid flow energy in said power stroke direction for providing uniformly powered acoustic signals.

3. Apparatus as set forth in claim 1 wherein said piston has a by-pass check valve responsive to said biasing of said piston in said power stroke direction for selectively by-passing said fluid through said piston for preventing the flow of said fluid through said orifice during said power stroke for power stroke fluid flow and causing said fluid flow through said orifice in said timing stroke for providing a relatively long period between said power strokes.

4. Apparatus for providing an underwater acoustic beacon that comprises:
    (a) a cylindrical housing having an internal rod forming pistons in first, second, third and fourth piston chambers;
    (b) means for circulating hydraulic fluid into said fourth chamber in a closed cycle having a fluid reservoir and an acoustic transducer that is actuated by a power stroke flow of said fluid from said fourth chamber to transmit square wave-form power outputs of sonic vibrations of about 5000 c.p.s.;

(c) means having an isotopic heat source for circulating uniform steam pressure into said first chamber in a closed cycle for biasing said piston in a power stroke for flowing said hydraulic fluid correspondingly;

(d) compressible metal membrane means completely separating said steam and hydraulic media in said second chamber;

(e) spring means in said second chamber for storing a portion of the energy of said power stroke and suddenly releasing it by moving said piston suddenly in a timing stroke to flow said hydraulic fluid correspondingly in said second, third and fourth chambers;

(f) means in said third piston chamber for selectively by-passing said hydraulic fluid through said third piston selectively to permit said fourth piston chamber to produce said sudden flow of said hydraulic fluid therein;

(g) means for circulating in a constricted orifice the flow of said hydraulic fluid from said third chamber in said timing stroke to slow the circulation of said hydraulic fluid during said timing stroke; and (h) means responsive to the biasing of said rod for selectively actuating said steam to bias said rod for said power stroke at the end of said timing stroke in a self-actuating cycle whose frequency depends on said steam pressure and said constricted orifice flow.

5. Apparatus as set forth in claim 4 wherein said means for circulating steam into said first chamber consists essentially of a boiler having an internal enclosed source, a condenser for converting steam from said first chamber into liquid during said timing stroke, pump means responsive to the movement of said rod for circulating said water into said boiler during said power stroke, and spring actuated means for by-passing said steam to compensate for the decrease in heat output from said source as said source decays for providing a constant steam pressure in said first chamber for providing uniform power strokes.

6. Apparatus as set forth in claim 4 wherein said acoustic transducer is a self-excited hydraulic oscillator valve for efficiently transmitting a uniform 100-watt acoustic output for 25 millisecond width during a 25 second operating cycle.

References Cited by the Examiner
UNITED STATES PATENTS

| | | | |
|---|---|---|---|
| 691,343 | 1/1902 | Abendroth | 103—50 |
| 3,194,207 | 7/1965 | Dunne | 340—5 |
| 3,212,472 | 10/1965 | Bouyoucos | 116—137 |

BENJAMIN A. BORCHELT, *Primary Examiner.*

W. KUJAWA, *Assistant Examiner.*